United States Patent
Kurtz et al.

(10) Patent No.: US 10,077,697 B2
(45) Date of Patent: Sep. 18, 2018

(54) SYSTEM AND METHOD FOR CONTROLLING AN ENGINE THAT INCLUDES LOW PRESSURE EGR

(71) Applicant: Ford Global Technologies, LLC, Dearborn, MI (US)

(72) Inventors: Eric Matthew Kurtz, Dearborn, MI (US); Waheed Alashe, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 200 days.

(21) Appl. No.: 14/997,866

(22) Filed: Jan. 18, 2016

(65) Prior Publication Data

US 2016/0131006 A1    May 12, 2016

Related U.S. Application Data

(62) Division of application No. 13/910,818, filed on Jun. 5, 2013, now Pat. No. 9,279,375.

(51) Int. Cl.
| | |
|---|---|
| *F01N 3/20* | (2006.01) |
| *F02D 41/00* | (2006.01) |
| *F02M 26/15* | (2016.01) |
| *F02M 26/47* | (2016.01) |
| *F02M 26/05* | (2016.01) |
| *F02M 26/06* | (2016.01) |
| *F02D 41/14* | (2006.01) |

(52) U.S. Cl.
CPC .......... *F01N 3/208* (2013.01); *F01N 3/2066* (2013.01); *F02D 41/0052* (2013.01); *F02D 41/0065* (2013.01); *F02D 41/1463* (2013.01); *F02M 26/05* (2016.02); *F02M 26/06* (2016.02); *F02M 26/15* (2016.02); *F02M 26/47* (2016.02); *F01N 2610/02* (2013.01); *F01N 2610/146* (2013.01); *F01N 2900/0414* (2013.01); *F01N 2900/1411* (2013.01); *F02D 41/1465* (2013.01); *Y02T 10/24* (2013.01); *Y02T 10/47* (2013.01)

(58) Field of Classification Search
CPC .... F01N 3/2066; F01N 3/208; F01N 2610/02; F01N 2610/146; F01N 2900/0414; F01N 2900/1411; F02D 41/0052; F02D 41/0065; F02D 41/1463; F02D 41/1465; F02M 26/05; F02M 26/06; F02M 26/15; F02M 26/47; Y02T 10/24; Y02T 10/47
USPC ................................ 60/280, 295, 302, 605.2
See application file for complete search history.

(56) References Cited

U.S. PATENT DOCUMENTS

| | | | |
|---|---|---|---|
| 7,415,389 B2 | 8/2008 | Stewart et al. | |
| 7,853,395 B2 | 12/2010 | Guo et al. | |
| 8,965,664 B2 * | 2/2015 | Yasui | F02D 41/0062 701/106 |
| 2007/0113544 A1 | 5/2007 | Nishina et al. | |

(Continued)

FOREIGN PATENT DOCUMENTS

WO    2012164713 A1    12/2012

*Primary Examiner* — Patrick Maines
*Assistant Examiner* — Dapinder Singh
(74) *Attorney, Agent, or Firm* — Julia Voutyras; McCoy Russell LLP

(57) ABSTRACT

Methods and systems for operating an engine that includes a low pressure EGR passage and a selective reduction catalyst are disclosed. In one example, an actuator is adjusted in response to a NOx mass flow rate in the low pressure EGR passage.

12 Claims, 4 Drawing Sheets

(56) References Cited

U.S. PATENT DOCUMENTS

2010/0023292 A1 1/2010 Willard et al.
2014/0130483 A1 5/2014 Miyake

* cited by examiner

SYSTEM AND METHOD FOR CONTROLLING AN ENGINE THAT INCLUDES LOW PRESSURE EGR

CROSS REFERENCE TO RELATED APPLICATIONS

The present application is a divisional of U.S. patent application Ser. No. 13/910,818, entitled "SYSTEM AND METHOD FOR CONTROLLING AN ENGINE THAT INCLUDES LOW PRESSURE EGR," filed on Jun. 5, 2013, the entire contents of which are hereby incorporated by reference for all purposes.

BACKGROUND/SUMMARY

A turbocharged engine may include high pressure exhaust gas recirculation (EGR) and low pressure EGR. High pressure EGR may be provided to an engine by passing exhaust gas from an exhaust system at a location upstream of a turbocharger turbine to an engine intake system at a location downstream of a turbocharger compressor. Low pressure EGR may be provided to an engine by passing exhaust gas from an engine exhaust system at a location downstream of a turbocharger turbine to an engine intake system at a location upstream of the turbocharger compressor. Low pressure EGR may have the benefit of being cooler than high pressure EGR so that engine charge temperature may be reduced. On the other hand, by using high pressure EGR, an engine control system may reduce an EGR mass fraction inducted into a cylinder at a faster rate in response to a change in engine load as compared to when low pressure EGR is provided to the engine. Thus, there may be advantages and disadvantages to using high pressure EGR and low pressure EGR.

The inventors herein have also recognized that high pressure EGR and low pressure EGR may be comprised of the same or different constituents. Consequently, engine emissions may vary depending on whether high pressure EGR or low pressure EGR is supplied to the engine. The inventors have addressed the differences between supplying high pressure EGR and low pressure EGR to an engine by developing a method for operating an engine, comprising: adjusting an actuator in response to a NOx mass flow rate in a low pressure EGR passage between an engine exhaust system and an engine air intake system.

By adjusting an actuator responsive to a NOx mass flow rate in a low pressure EGR passage, it may be possible to provide a technical result of adjusting engine NOx emissions to a desirable level. For example, if EGR is being supplied to the engine with a low NOx mass flow rate, an engine actuator may be adjusted to increase the engine's NOx mass flow output and engine fuel economy such that engine's NOx mass flow output remains below a threshold NOx level. Alternatively, if EGR is supplied to the engine with a higher NOx mass flow rate, the engine actuator may be adjusted to decrease the engine's NOx mass flow output. NOx supplied to the engine via EGR passes through the engine and cannot be reduced during combustion via adjusting engine operation. However, NOx formed during combustion of an air-fuel mixture may be adjusted inversely with respect to NOx supplied to the engine via EGR so that a desired engine NOx level may be provided. Thus, if the desired engine NOx mass flow rate is a constant, and if the NOx flow rate of exhaust gases located downstream of a selective catalytic reduction (SCR) catalyst is decreasing because of higher SCR efficiency, NOx formed in the engine as a result of combustion may be increased without increasing the engine's NOx mass flow rate since NOx flowing into the engine via EGR is decreasing.

The present description may provide several advantages. For example, the approach may allow engine emissions to be maintained at a desired level while engine fuel economy is improved. Additionally, the approach may be useful for improving the exchange of urea use for vehicle fuel economy. Further, the approach may be useful for improving transient engine emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
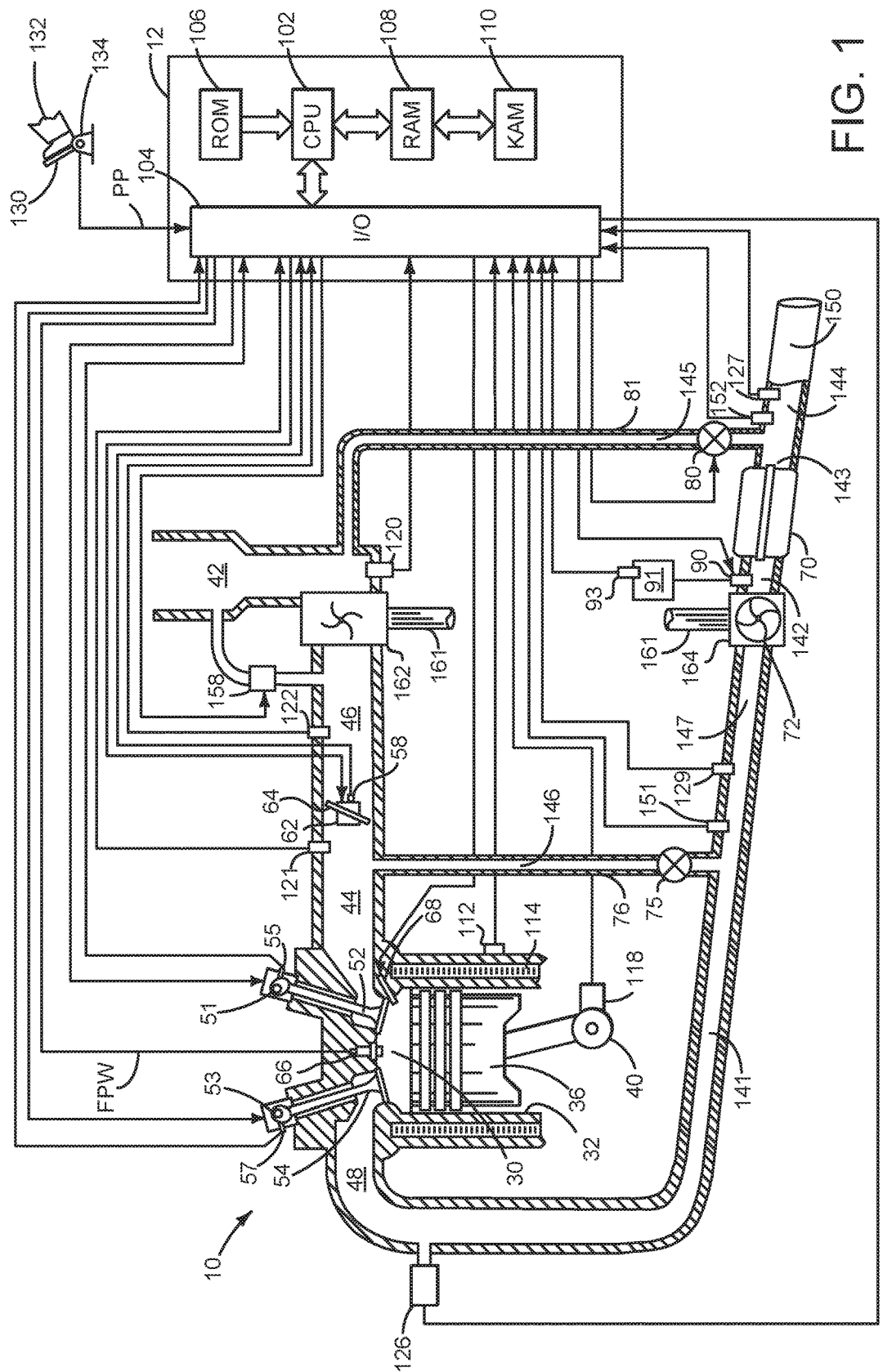
FIG. 1 shows a schematic depiction of an engine.
Figure 2:
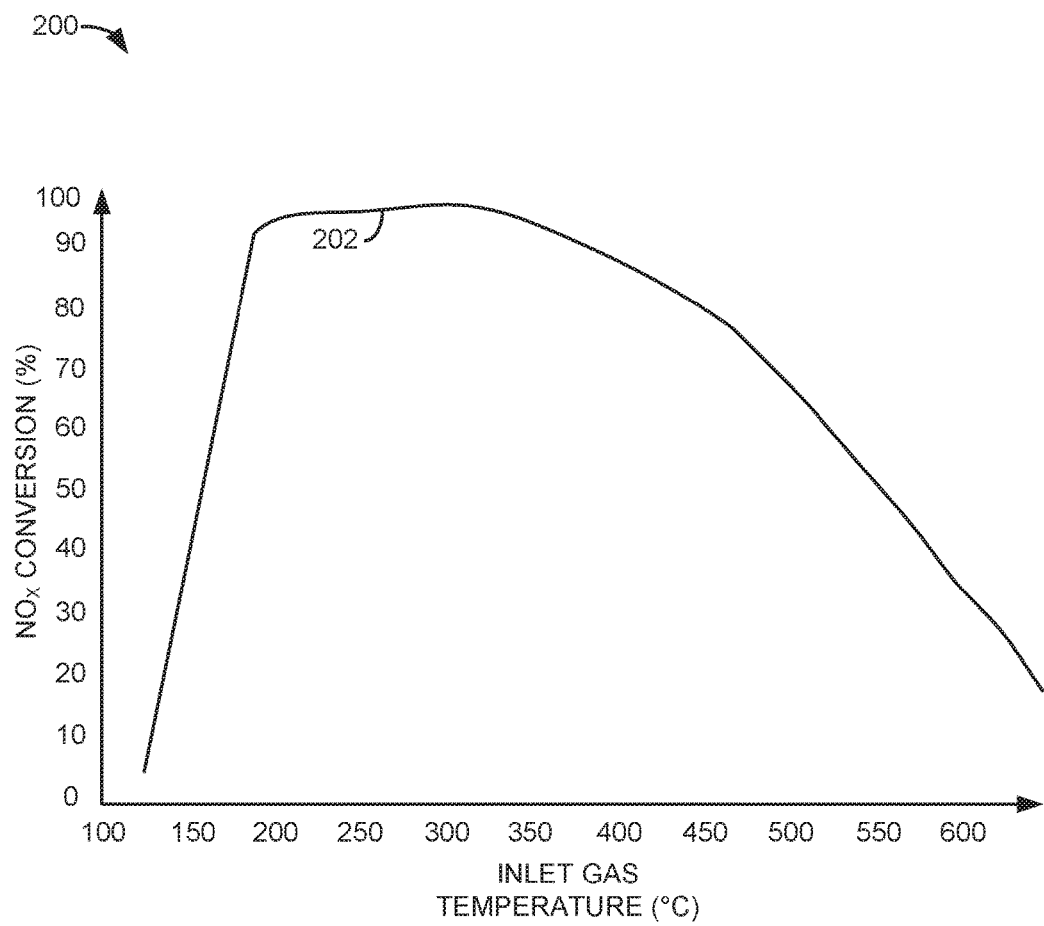
FIG. 2 shows a plot of SCR catalyst conversion efficiency versus SCR catalyst inlet gas temperature.

The present description is related to improving operation of an engine that includes high pressure EGR and low pressure EGR. Engine operation may be improved via compensating for changes in NOx levels that may occur in low pressure EGR systems due to after treatment operating conditions. FIG. 1 shows one example of a boosted diesel engine where the method of FIG. 3 may adjust engine operation to compensate for NOx in EGR gases. FIG. 2 shows NOx conversion efficiency for a selective reduction catalyst and it provides insight to the range of NOx conversion efficiency for a SCR.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Fuel injector 66 delivers fuel in proportion to the pulse width of signal FPW from controller 12. Fuel is delivered to fuel injector 66 by a fuel system including a fuel tank (not shown), fuel pump (not shown), fuel pump control valve (not shown), and fuel rail (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. In some examples, a charge air cooler may be provided. Compressor speed may be adjusted via adjusting a position of variable vane control 72 or compressor bypass valve 158. Variable vane control 72 adjusts a position of variable geometry turbine vanes. Exhaust gases can pass through turbine 164 supplying less energy to rotate turbine 164 when turbine vanes are in an open position. Exhaust gases can pass through turbine 164 and impart increased force on turbine 164 when turbine vanes are in a closed position. Compressor bypass valve 158 allows compressed air at the outlet of compressor 162 to be returned to the input of compressor 162. In this way, the efficiency of compressor 162 may be reduced so as to affect the flow of compressor 162 and reduce intake manifold pressure.

Combustion is initiated in combustion chamber 30 when fuel ignites via compression ignition as piston 36 approaches top-dead-center compression stroke. In some examples, a universal Exhaust Gas Oxygen (UEGO) sensor 126 may be coupled to exhaust manifold 48 upstream of emissions device 70. In one example, emissions device 70 is a selective catalytic reduction (SCR) catalyst. Alternatively, emissions device 70 is a lean NOx trap (LNT). Further, in some examples, the UEGO sensor 126 may be a NOx sensor that has both NOx and oxygen sensing elements. NOx sensor 129 outputs a voltage that is proportional to the concentration of NOx upstream of turbine 164. Alternatively, sensor 126 may be positioned downstream of turbine 164 and upstream of emissions device 70. NOx sensor 127 samples tailpipe NOx downstream of emissions device 70.

NOx concentration and NOx mass flow rate may be determined at locations 141-147. Location 141 is in engine exhaust manifold 48 upstream of high pressure EGR passage 71. Location 142 is downstream of turbine 164 and upstream of emissions device 70. Location 143 is at the outlet of emissions device 70 and upstream of low pressure EGR passage 81. Location 145 is in low pressure EGR passage 81. Location 144 is at a location downstream of emissions device 70 and downstream of EGR valve 80 in the direction of exhaust flow to the tail pipe 150. Location 146 is in high pressure EGR passage 76.

At lower engine temperatures glow plug 68 may convert electrical energy into thermal energy so as to raise a temperature in combustion chamber 30. By raising temperature of combustion chamber 30, it may be easier to ignite a cylinder air-fuel mixture via compression ignition.

As mentioned, in one example, emissions device 70 can include SCR catalyst bricks or a LNT. In another example, multiple emission control devices, each with multiple bricks, can be used. Emissions device 70 can include an oxidation catalyst in one example. In other examples, the emissions device may include a lean NOx trap followed by a selective catalyst reduction (SCR), and/or a diesel particulate filter (DPF). Urea may be injected upstream of SCR catalyst 70 via urea injector 90. Urea injector 90 receives urea from urea tank 91. Level sensor 93 senses the amount of urea stored in urea tank 91.

Low pressure exhaust gas recirculation (EGR) may be provided to the engine via EGR valve 80. EGR valve 80 is a two-way valve that closes or allows exhaust gas to flow from downstream of emissions device 70 to a location in the engine air intake system upstream of compressor 162. In some examples, low pressure EGR passage may include a throttle between intake passage 42 and low pressure EGR valve 80 or in tailpipe 150 to create a pressure differential.

High pressure EGR may be provided to the engine via high pressure EGR valve 75 and high pressure EGR passage 76. High pressure EGR may flow from exhaust manifold 48 to a location downstream of throttle 62 when high pressure EGR valve 75 is open and when pressure in exhaust manifold 48 is greater than pressure in intake manifold 44. High pressure EGR passage 76 and low pressure EGR passage 81 may include an EGR cooler in some examples.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 121 coupled to intake manifold 44; upstream exhaust pressure from pressure sensor 151; downstream, exhaust pressure from pressure sensor 152; boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition resulting in combustion. During the expansion stroke, the expanding gases push piston 36 back toward BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC.

Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Thus, the system of FIG. 1 provides for an engine system, comprising: an engine including a turbocharger, a high pressure EGR passage, a low pressure EGR passage, an air intake, and an exhaust manifold; an exhaust system coupled to the exhaust manifold and including a selective reduction catalyst; and a controller including executable instructions stored in non-transitory memory, the executable instructions adjusting an actuator in response to a NOx concentration of an EGR mass flowing through the low pressure EGR passage. The engine system includes where the low pressure EGR passage provides fluidic communication between the air intake passage and the exhaust system at a location downstream of the selective reduction catalyst.

In some examples, the engine system includes where the actuator is a fuel injector, and further comprising additional instructions for maintaining a desired EGR flow rate while a NOx concentration in the low pressure EGR passage varies, and adjusting a start of fuel injection timing for the fuel injector in response to the NOx concentration in the low pressure EGR passage. The engine system further comprises a NOx sensor positioned downstream of the selective reduction catalyst. The engine system includes where an output of the NOx sensor is representative of the NOx concentration of the EGR mass flowing through the low pressure EGR passage. The engine system includes where the controller includes further instructions for selectively providing EGR to the engine via the high pressure EGR passage and the engine and the low pressure EGR passage.

Referring now to FIG. 2, a plot of SCR catalyst conversion efficiency versus SCR catalyst inlet gas temperature is shown. Plot 200 represents an example of NOx conversion efficiency for emissions device 70 of FIG. 1. The Y axis represents NOx conversion efficiency in percentage. The X axis represents SCR inlet gas temperature in degrees C.

SCR efficiency curve 202 shows that emissions control device 70 has low NOx conversion efficiency at temperatures below 150° C. For example, NOx conversion efficiency at 150° C. is about 40 percent and lower for lower inlet gas temperatures. It may be observed that NOx conversion efficiency increases rapidly and reaches about 90 percent at about 185° C. Further, NOx conversion efficiency of emissions control device 70 increases slowly at temperatures above 185° C. and approaches 100 percent efficiency. Near 390° C., NOx conversion efficiency is reduced back to about 90 percent. NOx conversion efficiency continues to decrease as SCR inlet temperature continues to increase.

Thus, it may be observed that the concentration of NOx in low pressure EGR gases may vary even if engine output NOx is constant because SCR efficiency may vary. Further, as described in more detail with regard to the method of FIG. 3, engine output NOx (e.g., NOx produced during combustion and NOx recirculated back to the engine via exhaust gas) may be affected by the amount of NOx supplied to the engine via a low pressure EGR passage. Therefore, it may be beneficial to consider engine output NOx concentration or NOx mass flow rate and SCR efficiency when estimating the amount of NOx an engine produces when receiving low pressure EGR.

Figure 3:
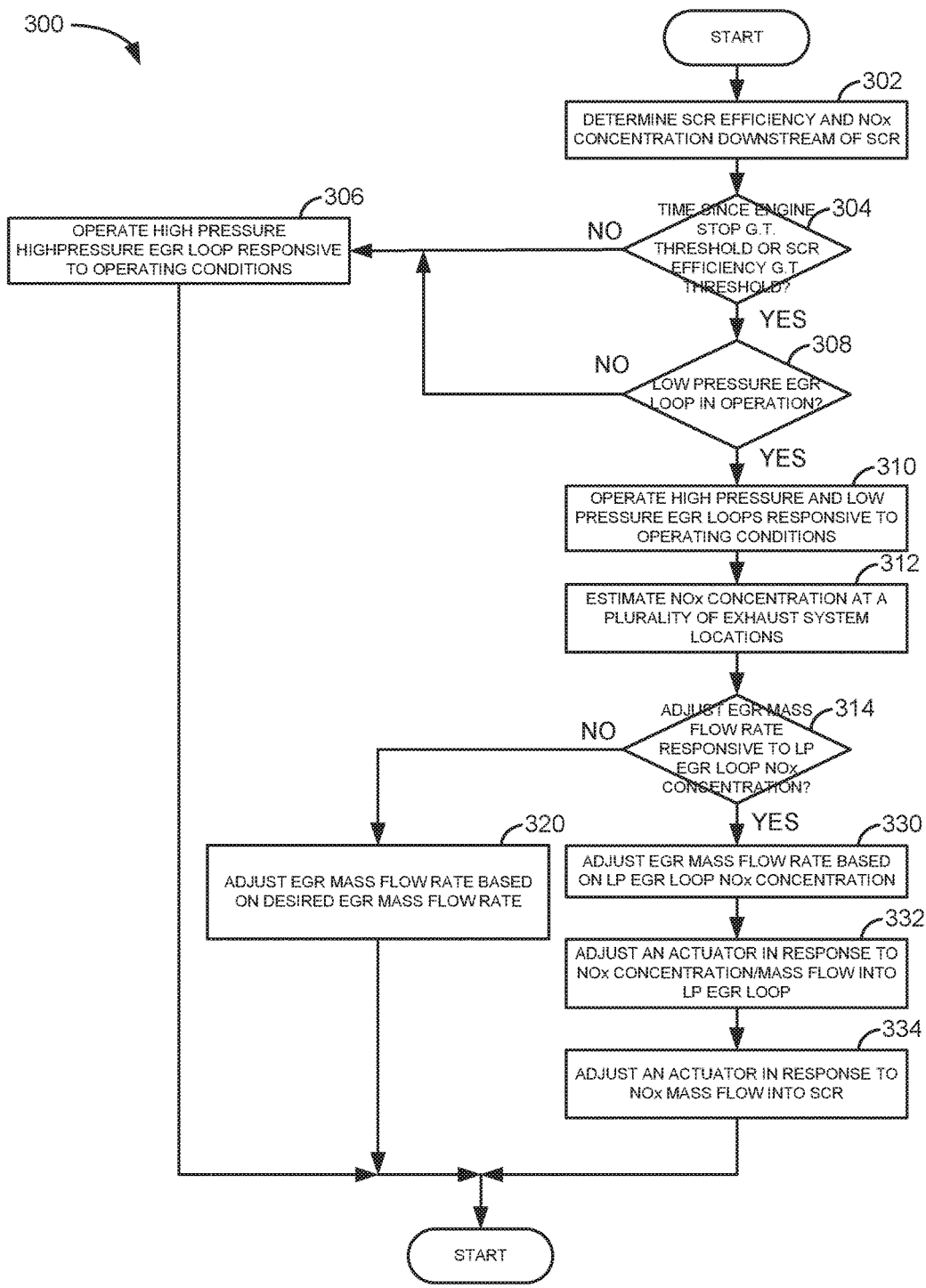
FIG. 3 is an example flow chart of a method for controlling an engine that includes high pressure EGR and low pressure EGR.

Referring now to FIG. 3, a method for operating an engine having low and high pressure EGR passages is shown. In on example, the system of FIG. 1 may be operated according to the method of FIG. 3. Further, the method of FIG. 3 may be incorporated into controller 12 of FIG. 1 via executable instructions stored in non-transitory memory.

At 302, method 300 determines SCR efficiency and the NOx concentration of exhaust gases downstream of a SCR. The SCR may be positioned in an exhaust system as shown in FIG. 1. In one example, SCR efficiency may be determined via subtracting a NOx concentration at a location downstream of the SCR from a NOx concentration upstream of the SCR and dividing the result by the NOx concentration at the location upstream of the SCR. Alternatively, SCR efficiency may be estimated based on SCR temperature, SCR age, $NH_3$ storage, and space velocity of the SCR. Method 300 proceeds to 304 after the SCR efficiency is determined.

At 304, method 300 judges whether a time since engine stop (e.g., engine running time) is greater than a threshold time or if SCR efficiency is greater than a threshold SCR efficiency or if a NOx concentration downstream of a SCR is less than a threshold NOx concentration. If time since engine stop is greater than a threshold amount of time, or if SCR efficiency is greater than a threshold SCR efficiency, or if a NOx concentration downstream of a SCR is less than a threshold NOx concentration, the answer is yes and method 300 proceeds to 308. Otherwise, the answer is no and method 300 proceeds to 306.

At 306, method 300 operates a high pressure EGR loop responsive to operating conditions. In one example, the high pressure EGR loop is operated in response to engine speed and load. Further, the high pressure EGR loop may be operated in response to engine temperature. If engine speed and load reach conditions where the high pressure EGR loop is operated, the high pressure EGR valve is opened and high pressure EGR is allowed to flow from a location in the exhaust system upstream of a turbine to an engine intake manifold. Method 300 proceeds to exit after the high pressure EGR loop is selectively operated.

At 308, method 300 judges whether or not the low pressure EGR loop is in operation. The low pressure EGR loop is being operated when EGR is passing through the low pressure EGR passage to the engine air intake. The low pressure EGR loop may include the engine, the low pressure EGR passage, the engine air intake, and the exhaust system. If the low pressure EGR loop is operated the answer is yes and method 300 proceeds to 310. Otherwise, the answer is no and method 300 proceeds to 306.

At 310, method 300 activates low pressure and high pressure EGR loops without necessarily operating both the high pressure EGR loop and the low pressure EGR loop responsive to operating conditions. In one example, the high pressure EGR loop is activated by allowing opening of a high pressure EGR valve, and it allows high pressure EGR to flow from a location in an exhaust system upstream of a turbine to the engine intake manifold. The low pressure EGR loop is activated by allowing opening of a low pressure EGR valve, and it allows low pressure EGR to flow from a location in an exhaust system downstream of a turbine to the engine intake system upstream of a compressor. The low pressure and high pressure EGR systems may be selectively operated after being activated in response to engine and vehicle operating conditions. Method 300 proceeds to 312 after the low and high pressure EGR loops are activated.

At 312, method 300 estimates NOx concentration at a plurality of locations in the exhaust system shown in FIG. 1. Further, method 300 determines the total mass flow, NOx concentrations, and NOx mass flow rates at selected locations in the exhaust system shown in FIG. 1.

The mass flow rate of NOx at location 141 is given by:

$$\dot{m}_{141} = \dot{m}_a + \dot{m}_f + \dot{m}_{146} + \dot{m}_{145} \text{ (total mass flow at location 141)}$$

$$\dot{m}_{NOx,141} = \dot{m}_{141}[NOx]_{141} C_0 \text{ (mass flow rate of } NOx \text{ at location 141)}$$

$$\dot{m}_{NOx,141} = \dot{m}_{NOx,eng} + \dot{m}_{NOx,146} + \dot{m}_{NOx,145}$$

Where $\dot{m}_{141}$ is a total mass flow rate at position 141 in FIG. 1, $\dot{m}_a$ is a mass flow rate of air entering the engine and it may be determined via a mass air flow sensor, $\dot{m}_f$ is a mass of fuel entering the engine and it may be determined via fuel injector pulse widths, $\dot{m}_{145}$ is a total mass flow rate at position 145 in FIG. 1, and where $\dot{m}_{146}$ is a total mass flow rate at position 146 in FIG. 1. $[NOx]_{141}$ represents a concentration of NOx at location 141 and $C_0$ represents a unit conversion factor. The mass flow rate of NOx at location 141 (engine output) is given by $\dot{m}_{NOx,141}$ and it is a sum of NOx mass flow formed in the engine $\dot{m}_{NOx,eng}$, high pressure passage NOx mass flow $\dot{m}_{NOx,146}$, and low pressure passage NOx mass flow $\dot{m}_{NOx,145}$.

The mass flow rate of NOx at location 142 is given by:

$$\dot{m}_{142} = \dot{m}_a + \dot{m}_f + \dot{m}_{145} \text{ (total mass flow at location 142)}$$

$$\dot{m}_{NOx,142} = \dot{m}_{142}[NOx]_{142} C_0 \text{ (mass flow rate of } NOx \text{ at location 142)}$$

$$\dot{m}_{NOx,142} = \dot{m}_{NOx,eng} + \dot{m}_{NOx,145}$$

$$[NOx]_{142} = [NOx]_{141}$$

Where $\dot{m}_{142}$ is the total mass flow rate at location 142, $[NOx]_{142}$ represents a concentration of NOx at location 142 and $C_0$ represents a unit conversion factor. The remaining parameters are as previously described.

The mass flow rate of NOx at location 143 is given by:

$$\dot{m}_{143} = \dot{m}_a + \dot{m}_f + \dot{m}_{145} = \dot{m}_{142} \text{ (total mass flow at location 143)}$$

$$\dot{m}_{NOx,143} = \dot{m}_{142}[NOx]_{142}\left(1 - \frac{\eta_{NOx}}{100}\right) C_0$$
(mass flow rate of *NOx* at location 143)

$$\dot{m}_{NOx,143} = \dot{m}_{NOx142}\left(1 - \frac{\eta_{NOx}}{100}\right) = (\dot{m}_{NOx,eng} + \dot{m}_{NOx,145})\cdot\left(1 - \frac{\eta_{NOx}}{100}\right)$$

Where $\dot{m}_{143}$ is the total mass flow rate at location 143, $\dot{m}_{NOx,143}$ is the mass flow rate of NOx at location 143, $\eta_{NOx}$ is the NOx conversion efficiency of the SCR (e.g., 70 in FIG. 1). The other parameters are as previously described.

The mass flow rate of NOx at location 144 is given by:

$$\dot{m}_{144} = \dot{m}_a + \dot{m}_f$$

$$\dot{m}_{NOx,144} = \dot{m}_{NOx,143} - \dot{m}_{NOx,145}$$

$$\dot{m}_{NOx,144} = \dot{m}_{NOx,eng}\left(1 - \frac{\eta_{NOx}}{100}\right) - \dot{m}_{NOx,145}\left(\frac{\eta_{NOx}}{100}\right)$$

Where $\dot{m}_{144}$ is the total mass flow rate at location 144 and where $\dot{m}_{NOx,144}$ is the mass flow rate of NOx at location 144. The other parameters are as previously described.

The mass flow rate of NOx at location 145 is given by:

$$\dot{m}_{NOx,145} = \frac{\dot{m}_{145}}{\dot{m}_{143}}\dot{m}_{NOx143}$$

$$\dot{m}_{NOx,145} = \dot{m}_{145}[NOx]_{142}C_0\left(1 - \frac{\eta_{NOx}}{100}\right)$$

$$\dot{m}_{142}[NOx]_{142}C_0 = \dot{m}_{NOx,eng} + \dot{m}_{145}[NOx]_{142}C_0\left(1 - \frac{\eta_{NOx}}{100}\right)$$

$$\dot{m}_{NOx,eng} = \left[\dot{m}_{142} - \dot{m}_{145}\left(1 - \frac{\eta_{NOx}}{100}\right)\right][NOx]_{142}C_0$$

$$[NOx]_{142} = \frac{\dot{m}_{NOx,eng}}{C_0\left(\dot{m}_a + \dot{m}_f + \dot{m}_{145}\frac{\eta_{NOx}}{100}\right)}$$

Where $\dot{m}_{NOx,145}$ is the NOx mass flow rate at location 145, $[NOx]_{142}$ is the concentration of NOx at location 142, and where the other parameters are as previously described. The NOx mass flow rate at location 145 is given by $$\dot{m}_{145}[NOx]_{142}C_0\left(1 - \frac{\eta}{100}\right).$$

The inventors show one way to estimate the mass flow rate of NOx into an SCR catalyst.

Case 1: after treatment is 100% efficient $$\dot{m}_{NOx,145} = 0$$

$$\dot{m}_{Nox147} = \dot{m}_{NOx,eng}$$

$$\dot{m}_{NOx147} = (\dot{m}_a + \dot{m}_f + \dot{m}_{145})\cdot C_0 \cdot [NOx]_{FG1}$$

Where $\dot{m}_{NOx,145}$ is the NOx mass flow rate at location 145, where $\dot{m}_{NOx,147}$ is the NOx mass flow rate at location 147, where $\dot{m}_{NOx,eng}$ is the NOx mass flow rate at location 141 or output from the engine, where $\dot{m}_a$ is a mass flow rate of air entering the engine, where $\dot{m}_f$ is a mass of fuel entering the engine, where $\dot{m}_{145}$ is a total mass flow rate at position 145 in FIG. 1, where $C_0$ is a unit conversion factor, and where $[NOx]_{FG1}$ is engine output NOx concentration for case 1. Case 1 shows one extreme where the SCR converts all NOx entering the SCR to $N_2$ and $H_2O$ and where the amount of NOx entering the SCR is equivalent to the amount of NOx produced by the engine.

Case 2: after treatment is 0% efficient $$\dot{m}_{NOx147} = \dot{m}_{NOx,eng} + \dot{m}_{NOx,145}$$

$$\dot{m}_{NOx,145} = \dot{m}_{145}[NOx]_{FG2}\cdot C_0$$

$$\dot{m}_{NOx,147} = \dot{m}_{NOx,eng} + \dot{m}_{145}[NOx]_{FG2}\cdot C_0$$

$$\dot{m}_{NOx,147} = \dot{m}_a + \dot{m}_f + \dot{m}_{145}[NOx]_{FG1}\cdot C_0 + \dot{m}_{145}[NOx]_{FG2}\cdot C_0$$

$$\dot{m}_{NOx,147} = \dot{m}_a + \dot{m}_f + \dot{m}_{145}[NOx]_{FG2}\cdot C_0$$

$$\dot{m}_{NOx,144} = \dot{m}_{NOx,eng}$$

$$\dot{m}_{NOx,eng} = (\dot{m}_a + \dot{m}_f)[NOx]_{FG2}\cdot C_0$$

Where the parameters of case 2 are the same as for case 1 and where $[NOx]_{FG2}$ is engine output NOx concentration for case 2. Case 2 shows the other extreme where the SCR converts no NOx entering the SCR, and the NOx entering the SCR is the amount of NOx produced by the engine plus the NOx recirculated through the low pressure EGR passage.

NOx production in the engine is equivalent between case 1 and case 2 since the boundary conditions for combustion between the two cases is equivalent. Therefore, the following equation holds:

$$\dot{m}_{NOx,147} = (\dot{m}_a + \dot{m}_f + \dot{m}_{145})[NOx]_{FG1} \cdot C_0 = (\dot{m}_a + \dot{m}_f)[NOx]_{FG2} \cdot C_0$$

As a result, an estimate of a concentration of engine output NOx while an SCR is active may be determined from a concentration of engine output NOx when the SCR is inactive. In particular, $[NOx]_{FG2}$ is empirically determined and stored in memory as a table or function. The table or function may be indexed by speed and load as well as other parameters. Variables $\dot{m}_a$ and $\dot{m}_f$ are know from fuel injection timing and intake air measurements. Additionally, $\dot{m}_{145}$ may be determined based on a pressure differential across low pressure EGR valve 80 and low pressure EGR valve position. Unknown variable $[NOx]_{FG1}$ may be determined from the know variables. Once $[NOx]_{FG1}$ is determined, it may be the basis for adjusting urea injection, EGR, fuel pressure, boost pressure, and other actuators. Thus, the NOx concentration in the high pressure EGR passage may be based on estimated SCR efficiency or a known NOx concentration when the SCR is operating at less than a threshold efficiency. Further, the NOx concentration entering the SCR may be estimated without a NOx sensor positioned upstream of emissions device 70 in the system of FIG. 1.

Thus, a method for operating an engine is provided, comprising: adjusting an actuator in response to a NOx mass flow rate into a NOx catalyst (e.g., LNT or SCR) when the NOx catalyst is operating at an efficiency greater than a first threshold efficiency during a first condition, the NOx mass flow rate into the NOx catalyst based on tailpipe NOx mass flow rate when the NOx catalyst is operating at an efficiency of less a second threshold efficiency. The method includes where the NOx catalyst is a SCR or a LNT. The method includes where the actuator is a urea injector or an EGR valve. The method also includes where the actuator is a fuel pump. The method includes where the first threshold efficiency is greater than 50% and where the second threshold efficiency is less than 25%. In some examples, the method further comprising adjusting the actuator in response to an estimate of NOx flow rate into the NOx catalyst during a second condition, where the estimate of NOx flow rate into the NOx catalyst is based on one of NOx catalyst efficiency, mass flow rate of NOx through low pressure EGR loop, or NOx concentration in the low pressure EGR loop. The first and second conditions may be different SCR or LNT operating conditions. Such operation may be used in conjunction with adjusting an actuator in response to a concentration of NOx in a low pressure and/or high pressure EGR passage.

Returning to FIG. 3, method 300 proceeds to 314 after the total mass flow rate, NOx flow rate, and NOx concentration at each location is determined.

At 314, method 300 judges whether or not to adjust EGR mass flow rate in response to low pressure EGR loop NOx concentration. For example, method 300 may adjust the EGR mass flow rate based on NOx concentration so that a desired NOx flow rate in the low pressure EGR loop may be provided to the engine. On the other hand, the total EGR mass flow rate may be adjusted to follow a desired EGR mass flow rate so that a desired EGR mass flow rate is provided irrespective of the NOx concentration in the low pressure EGR loop. Thus, in this example, the NOx flow rate may be allowed to vary. In one example, method 300 selects to adjust the EGR mass flow rate through the low pressure EGR passage in response to the low pressure EGR loop NOx concentration when SCR efficiency is less than threshold SCR efficiency so that tailpipe NOx may be controlled. If SCR efficiency is greater than the threshold efficiency, the EGR mass flow rate is adjusted to follow the desired EGR flow rate and an actuator is adjusted to control tailpipe NOx. If method 300 judges that the EGR mass is to be adjusted in response to the NOx concentration in the low pressure EGR loop, the answer is yes and method 300 proceeds to 330. Otherwise, the answer is no and method 300 proceeds to 320.

At 330, method 300 adjusts the total EGR mass flow rate based on a NOx concentration in the low pressure EGR passage. The total EGR mass flow rate may be comprised of flow through the high and low pressure loops, Thus, high pressure loop EGR may be adjusted based on NOx concentration in the low pressure EGR loop. For example, if NOx concentration in the low pressure EGR loop is low due to high SCR efficiency, the low and/or high pressure EGR mass flow rate may be decreased. Alternatively, if NOx concentration in the low pressure EGR loop is high due to high SCR efficiency, the low and/or high pressure EGR mass flow rate may be increased. If the NOx concentration in the low pressure EGR loop is increasing or at a high level, the EGR mass flowing through the low pressure EGR passage or loop may be reduced to maintain a NOx flow rate through the low pressure EGR passage. If the NOx concentration in the low pressure EGR loop is decreasing, the EGR mass flowing through the low pressure EGR passage may be increased to maintain a NOx flow rate through the low pressure EGR passage. The EGR mass flow rate in the low pressure EGR loop may be increased via increasing an opening amount of the low pressure EGR valve. The EGR mass flow rate in the low pressure EGR loop may be decreased via decreasing an opening amount of the low pressure EGR valve. Method 300 proceeds to 332 after the EGR mass flow rate is adjusted.

At 332, method 300 adjusts an actuator in response to NOx concentration and/or NOx mass flow rate into the low pressure EGR loop. In one example, the actuator may be a fuel injector. The opening time of the fuel injector may be advanced when the NOx concentration decreases and/or when the NOx mass flow rate decreases. By advancing fuel injector opening timing when NOx concentration and/or NOx mass flow rate decreases, the NOx created during combustion may be increased slightly to offset the NOx concentration and/or NOx mass flow rate decrease flowing through the engine via the low pressure EGR loop. Further, advancing start of fuel injection opening timing may increase vehicle fuel economy via increasing engine torque. Thus, if the SCR is operating efficiently, less EGR may be provided to the engine via the low pressure EGR passage so that engine operation may be adjusted to improve engine performance. If instead, the NOx concentration and/or NOx flow rate is increasing, the start of injector opening timing may be retarded so that NOx produced in the engine during combustion may be reduced. In this way, injector timing may be adjusted to compensate for changes in NOx concentration and/or NOx flow in the low pressure EGR passage.

In another example, the actuator may be a urea injector. If a NOx concentration in the low pressure EGR passage or a NOx flow rate in the low pressure EGR passage is greater than is desired, the urea injector may be opened further to provide additional urea to the SCR. Similarly, if a NOx concentration in the low pressure EGR passage or a NOx flow rate in the low pressure EGR passage is less than is desired, the urea injector may be closed further to provide less urea to the SCR.

In another example, the actuator may be a fuel pump. If a NOx concentration in the low pressure EGR passage or a NOx flow rate in the low pressure EGR passage is greater than is desired, the fuel pump output pressure may be increased as EGR flow to the engine increases to reduce NOx produced during combustion and reduce particulate emissions. Similarly, if a NOx concentration in the low pressure EGR passage or a NOx flow rate in the low pressure EGR passage is less than is desired, the fuel pump pressure may be decreased as EGR flow to the engine is reduced to engine fuel economy.

In another example, the actuator may be a low pressure EGR valve. If a NOx concentration in the low pressure EGR passage or a NOx flow rate in the low pressure EGR passage is greater than is desired, the low pressure EGR valve opening amount may be reduced to lower the amount of NOx flowing back into the engine. Similarly, if a NOx concentration in the low pressure EGR passage or a NOx flow rate in the low pressure EGR passage is less than is desired, the low pressure EGR valve opening amount may be increased to raise the amount of NOx flowing back to the engine. Method 300 proceeds to 334 after the actuator is adjusted.

At 334, method 300 adjusts an actuator in response to the NOx mass flow rate into the SCR. In one example, the actuator is a urea injector and an amount of injected urea is increased in response to an increase in NOx flowing into the SCR. Method 300 proceeds to exit after the actuator is adjusted.

It should be mentioned that any combination of actuators mentioned at 332 may be adjusted in response to NOx concentration and/or NOx flow rate in the low pressure EGR passage.

At 320, method 300 adjusts low pressure passage EGR flow based on a desired low pressure EGR flow. Additionally, an actuator is adjusted in response to NOx concentration and/or NOx flow rate in the low pressure EGR loop. For example, if the desired EGR flow rate through the low pressure EGR passage is a constant flow rate, an actuator is adjusted to compensate for the NOx concentration and/or NOx mass flow rate in the low pressure EGR passage. In particular, if the NOx concentration and/or NOx flow rate increases through the low pressure EGR passage, start of injection timing for a fuel injector is retarded to reduce the amount of NOx produced by the engine during combustion. As a result, when NOx flows through the low pressure EGR passage and combines with NOx produced during combustion, the total amount of NOx is reduced as compared to if no actuator adjustment occurs. Conversely, if the NOx concentration and/or NOx flow rate decreases through the low pressure EGR passage, start of injection timing for a fuel injector is advanced to induce the amount of NOx produced by the engine during combustion and increase engine torque and fuel economy. Therefore, when less NOx flows through the low pressure EGR passage and combines with NOx produced during combustion, the total amount of NOx may be maintained with increased fuel efficiency.

In other examples, the actuator may be a fuel pump. The fuel pump output pressure may be decreased in response to an increase in NOx concentration and/or NOx mass flow through the low pressure EGR passage so as to reduce the amount of NOx produced during combustion so that the total amount of NOx passing through the engine is maintained at a desired level. Similarly, fuel pump output pressure may be increased in response to a decrease in NOx concentration and/or NOx mass flow through the low pressure EGR passage so as reduce engine soot production.

In another example, the actuator may be a low pressure EGR valve. The low pressure EGR valve opening amount may be increased in response to an increase in NOx concentration and/or NOx mass flow through the low pressure EGR passage so as to reduce the amount of NOx produced during combustion. Similarly, low pressure EGR valve opening amount may be decreased in response to a reduction in NOx concentration and/or NOx mass flow through the low pressure EGR passage so as to increase engine fuel efficiency while maintaining NOx flow rate into the SCR catalyst.

In another example, the actuator may be a waste gate or a variable geometry turbine (VGT) actuator for adjusting boost pressure (e.g., intake manifold pressure). The waste gate opening amount may be decreased in response to a reduction in EGR flow or NOx concentration and/or NOx mass flow through the low pressure EGR passage being reduced so as to improve engine fuel efficiency. Similarly, waste gate opening amount may be increased in response to an increase in NOx concentration and/or NOx mass flow through the low pressure EGR passage so as to maintain an engine air-fuel ratio in the presence if a higher EGR mass flow rate used to reduce NOx produced by the engine during combustion.

In still another example, the actuator may be a urea injector for adjusting urea supplied to a SCR. The urea injector opening time may be increased in response to an increase in NOx concentration and/or NOx mass flow through the low pressure EGR passage so as to increase SCR efficiency and reduce NOx exiting the SCR. Similarly, the urea injector opening timing may be decreased in response to a reduction in NOx concentration and/or NOx mass flow through the low pressure EGR passage so as to decrease urea consumption. Method 300 proceeds to exit after the EGR flow rate and actuator are adjusted.

Thus, the method of FIG. 3 provides for a method for operating an engine, comprising: adjusting an actuator in response to a NOx mass flow rate in a low pressure EGR passage between an engine exhaust system and an engine air intake system. The method includes where the actuator is a urea injector, and further comprising decreasing an amount of urea injected to the engine exhaust system as the NOx mass flow rate decreases.

In some examples, the method includes where the actuator is a fuel injector, and further comprising advancing a start of fuel injection timing in response to a reduction in NOx mass flow rate in the low pressure EGR passage. The method includes where the actuator is an EGR valve, and further comprising reducing an amount of EGR supplied to the engine in response to a reduction in NOx mass flow rate in the low pressure EGR passage. The method includes where the actuator is a fuel pump, and further comprising reducing fuel pump output pressure in response to a reduction in NOx mass flow rate in the low pressure EGR passage. The method includes where the actuator is a turbocharger waste gate or VGT, and further comprising reducing boost pressure in response to a reduction in NOx mass flow rate in the low pressure EGR passage. The method includes where the NOx mass flow rate is estimated based on a concentration of NOx downstream of a SCR catalyst and a mass flow rate in the low pressure EGR passage.

The method of FIG. 3 also provide for a method for operating an engine, comprising: selecting between delivering EGR to an engine via a high pressure EGR passage and a low pressure EGR passage in response to a concentration of NOx in an exhaust passage location downstream of an SCR catalyst. The method includes where the high pressure EGR passage is selected in response to a concentration of NOx in the exhaust passage location downstream of the SCR catalyst being higher than a threshold NOx concentration, and where the low pressure EGR passage is selected in response to the concentration of NOx in the exhaust passage location downstream of the SCR catalyst being less than the threshold NOx concentration. The method further comprises adjusting an actuator in response to NOx mass flow rate in the low pressure EGR passage.

In some examples, the method includes where the actuator is a urea injector. The method includes where the actuator is a fuel injector, and where the fuel injector start of injection timing during a cylinder cycle is advanced as a concentration of NOx in the low pressure EGR passage decreases. The method further comprises injecting an amount of urea to the SCR catalyst in response to a NOx concentration of exhaust gas entering the SCR catalyst. The method further comprises adjusting EGR mass flow rate in response to a concentration of NOx in the low pressure EGR passage.

Figure 4:
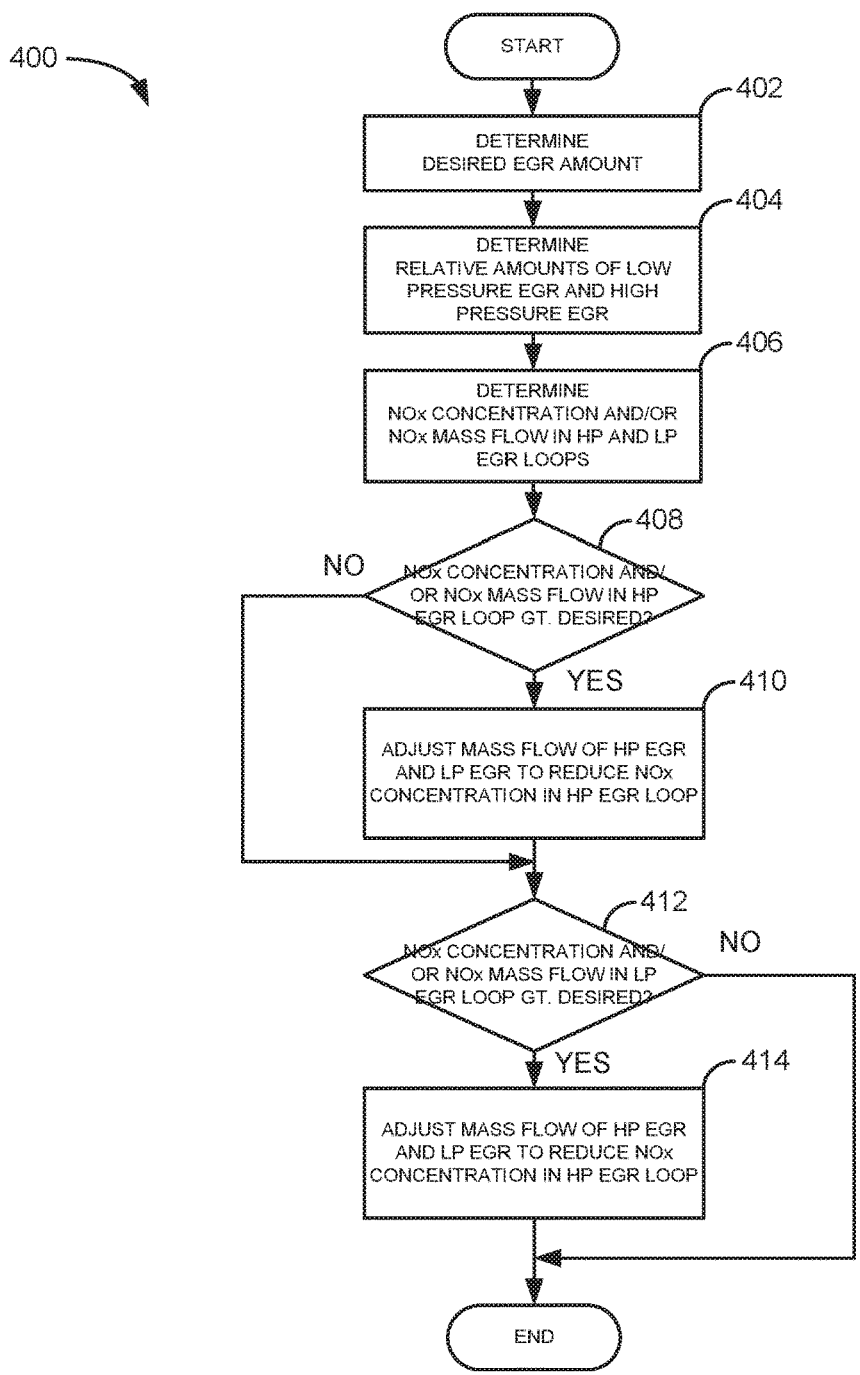
FIG. 4 is an example flow chart of a method for adjusting EGR between low pressure and high pressure EGR loops.

Referring now to FIG. 4, a method for adjusting EGR between low pressure and high pressure EGR loops is shown. In on example, the system of FIG. 1 may be operated according to the method of FIG. 4. Further, the method of FIG. 4 may be incorporated into controller 12 of FIG. 1 via executable instructions stored in non-transitory memory.

At 402, method 400 determines a desired EGR amount or EGR flow rate for the engine. In one example, the desired EGR amount is empirically determined and stored in memory locations that are indexed based on the engine's present speed and load (e.g., torque). Method 400 proceeds to 404 after the desired EGR amount is determined.

At 404, method 400 determines the relative amounts of EGR to be supplied via the low pressure EGR loop and the high pressure EGR loop. In one example, each of the low pressure EGR loop and the high pressure EGR loop are assigned a fraction of the desired EGR amount. The sum of EGR supplied in by the low pressure EGR loop and the EGR supplied by the high pressure loop is equal to the desired EGR amount. The fractions of the total EGR amount that are assigned to the low pressure EGR loop and the high pressure EGR loop may be based on engine speed and load. For example, at an engine speed of 2000 RPM and 0.3 load, 60% of the total desired EGR mass flow rate may be provided via the high pressure EGR loop and 40% of the total desired EGR mass flow rate may be provided via the low pressure EGR loop. Further, the fractions may be adjusted based on engine temperature, SCR temperature, and other operating conditions. Method 400 proceeds to 406 after low pressure and high pressure EGR relative amount are determined.

At 406, method 400 determines NOx concentration and/or NOx flow rate of exhaust gases in the high pressure and low pressure EGR loops. In one example, the NOx concentrations in the high pressure EGR loop may be determined via a NOx sensor such as NOx sensors 126 or 129 shown in FIG. 1. For example, the NOx concentration at NOx sensor 129 is NOx concentration in high pressure EGR passage 76 and NOx concentration at NOx sensor 127 is NOx concentration in low pressure EGR passage 81. In one example, the NOx mass flow rate in high pressure EGR passage 76 is determined by a pressure differential between exhaust manifold 48 and intake manifold 44 as determined via pressure sensors 121 and 129. The pressure differential is a basis for indexing an empirically determined function that describes flow through high pressure EGR valve 75. The mass flow through high pressure EGR passage 76 is multiplied by the NOx concentration in high pressure EGR passage 76 to provide a NOx mass flow rate through high pressure EGR passage 76. Similarly, the NOx mass flow rate in low pressure EGR passage 81 is determined by a pressure differential between intake passage 42 and tail pipe 150 as determined via barometric pressure and pressure sensor 152. The pressure differential is a basis for indexing an empirically determined function that describes flow through low pressure EGR valve 80. The mass flow through low pressure EGR passage 81 is multiplied by the NOx concentration to provide NOx mass flow rate through low pressure EGR passage 81. The NOx concentration in the low pressure EGR loop may be determined by NOx sensor 127 shown in FIG. 1. The NOx mass flow rates in each of the respective EGR loops may be determined by multiplying the NOx concentration in the EGR passage by the EGR flow rate through the EGR passage. Method 400 proceeds to 408 after the NOx concentration and NOx flow rates are determined.

At 408, method 400 judges whether or not the NOx concentration and/or the NOx flow rate in the high pressure EGR loop is greater than a threshold NOx concentration or NOx flow rate. The threshold NOx concentration and/or NOx flow rate may vary with operating conditions. If the NOx concentration or NOx flow rate in the high pressure EGR passage is greater than a threshold amount, the mass flow rate of EGR in the high pressure EGR passage may be increased to attempt to reduce the cylinder combustion temperature. If the NOx concentration or NOx flow rate in the high pressure EGR passage is less than a threshold amount, the mass flow rate of EGR in the high pressure EGR passage may be decreased to attempt to increase the engine fuel economy. If method 400 judges that the NOx concentration and/or NOx mass flow rate in the high pressure EGR loop is greater than desired, method 400 proceeds to 410. Otherwise, method 400 proceeds to 412.

At 410, method 400 increases the mass flow rate in the high pressure EGR passage to provide additional EGR to the engine. However, the mass flow rate in the high pressure EGR passage may also be limited to a threshold amount. The EGR mass flow rate in the high pressure EGR passage may be incrementally increased so that the high pressure EGR mass flow rate gradually increases. The EGR flow rate in the low pressure EGR loop may be decreased to offset the increase in the EGR flow rate of the high pressure EGR loop. Method 400 proceeds to 412 after the mass flow rate in the high pressure EGR passage is increased.

At 412, method 400 judges whether or not the NOx concentration and/or the NOx flow rate in the low pressure EGR loop is greater than a threshold NOx concentration or NOx flow rate. The threshold NOx concentration and/or NOx flow rate may vary with operating conditions. If the NOx concentration or NOx flow rate in the low pressure EGR passage is greater than a threshold amount, the mass flow rate of EGR in the high pressure EGR passage may be increased to attempt to reduce the cylinder combustion temperature. If the NOx concentration or NOx flow rate in the low pressure EGR passage is less than a threshold amount, the mass flow rate of EGR in the high pressure EGR passage may be decreased to attempt to increase the engine fuel economy. If method 400 judges that the NOx concentration and/or NOx mass flow rate in the low pressure EGR loop is greater than desired, method 400 proceeds to 414. Otherwise, method 400 proceeds to exit. If method 400 exits, it may also reduce the EGR mass flow rate in the high pressure EGR loop to attempt to improve engine fuel economy.

At 414, method 400 adjusts the EGR mass flow rate in the high pressure EGR loop in response to the NOx concentration or NOx flow rate in the low pressure EGR loop. The EGR mass flow rate in the high pressure EGR loop may be increased via further opening the high pressure EGR valve. The EGR flow rate in the low pressure EGR loop may be decreased to offset the increase in the EGR flow rate of the high pressure EGR loop. Method 400 proceeds to exit after the high pressure EGR flow rate is adjusted.

Additionally, a ratio of low pressure EGR to high pressure EGR may be adjusted while the total EGR amount provided to the engine is maintained in response to a NOx concentration in the low and/or high pressure EGR loop passages. If NOx concentration in the low pressure EGR passage in a particular SCR/LNT temperature range is greater than desired, the mass fraction of EGR entering the engine from the high pressure EGR loop may be increased. Similarly, if NOx concentration in the low pressure EGR passage in a particular SCR/LNT temperature range is less than desired, the mass fraction of EGR entering the engine from the high pressure EGR loop may be decreased.

Thus, the method of FIG. 4 provides for a method for operating an engine, comprising: adjusting an amount of high pressure EGR and an amount of low pressure EGR supplied to an engine in response to a NOx mass flow in one of a high pressure EGR passage and a low pressure EGR passage. The method includes where an EGR flow rate in the high pressure EGR passage is greater than an EGR flow rate in the low pressure EGR passage when a NOx concentration in the low pressure EGR passage is greater than a threshold NOx concentration. The method also includes where an EGR flow rate in the high pressure EGR passage is less than an EGR flow rate in the low pressure EGR passage when a NOx concentration in the low pressure EGR passage is less than a threshold NOx concentration. The method includes where the amount of high pressure EGR and the amount of low pressure EGR combine in the engine to provide a desired amount of EGR. The method includes where the amount of high pressure EGR is increased in response to an increase in NOx concentration in the low pressure EGR passage. The method includes where the amount of high pressure EGR is decreased in response to a decrease in NOx concentration in the low pressure EGR passage.

As will be appreciated by one of ordinary skill in the art, the methods described in FIGS. 3 and 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps, methods, or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for operating an engine, comprising:
adjusting an actuator in response to a NOx mass flow rate in a low pressure EGR passage between an engine exhaust system and an engine air intake system, where the NOx mass flow rate is estimated based on a concentration of NOx downstream of a SCR catalyst and a mass flow rate in the low pressure EGR passage.

2. The method of claim 1, where the actuator is an EGR valve, and further comprising reducing an amount of EGR supplied to the engine in response to a reduction in NOx mass flow rate in the low pressure EGR passage.

3. A method for operating an engine, comprising:
adjusting an actuator in response to a NOx mass flow rate in a low pressure EGR passage between an engine exhaust system and an engine air intake system, where the actuator is a urea injector, and further comprising decreasing an amount of urea injected to the engine exhaust system as the NOx mass flow rate decreases.

4. The method of claim 3, where the NOx mass flow rate is estimated based on a concentration of NOx downstream of a SCR catalyst and a mass flow rate in the low pressure EGR passage.

5. A method for operating an engine, comprising:
adjusting an actuator in response to a NOx mass flow rate in a low pressure EGR passage between an engine exhaust system and an engine air intake system, where the actuator is a fuel injector, and further comprising advancing a start of fuel injection timing in response to a reduction in NOx mass flow rate in the low pressure EGR passage.

6. A method for operating an engine, comprising:
adjusting an actuator in response to a NOx mass flow rate in a low pressure EGR passage between an engine exhaust system and an engine air intake system, where the actuator is a fuel pump, and further comprising reducing fuel pump output pressure in response to a reduction in NOx mass flow rate in the low pressure EGR passage.

7. A method for operating an engine, comprising:
adjusting an actuator in response to a NOx mass flow rate in a low pressure EGR passage between an engine exhaust system and an engine air intake system, where the actuator is a turbocharger waste gate or variable geometry turbocharger actuator, and further comprising reducing boost pressure in response to a reduction in NOx mass flow rate in the low pressure EGR passage.

8. A method for operating an engine, comprising:
adjusting an amount of high pressure EGR and an amount of low pressure EGR provided to an engine in response to a NOx mass flow in one of a high pressure EGR passage and a low pressure EGR passage, where the amount of high pressure EGR is increased in response to an increase in NOx concentration in the low pressure EGR passage.

9. The method of claim 8, where an EGR flow rate in the high pressure EGR passage is greater than an EGR flow rate in the low pressure EGR passage when a NOx concentration in the low pressure EGR passage is greater than a threshold NOx concentration.

10. The method of claim 8, where an EGR flow rate in the high pressure EGR passage is less than an EGR flow rate in the low pressure EGR passage when a NOx concentration in the low pressure EGR passage is less than a threshold NOx concentration.

11. The method of claim 8, where the amount of high pressure EGR and the amount of low pressure EGR combine in the engine to provide a desired amount of EGR, and wherein a NOx mass flow rate in the high pressure EGR passage is based on a NOx concentration in the high pressure EGR passage, and where the NOx concentration in the high pressure EGR passage is based on estimated SCR efficiency or a known NOx concentration when an SCR is operating at less than a threshold efficiency.

12. The method of claim 8, where the amount of high pressure EGR is decreased in response to a decrease in NOx concentration in the low pressure EGR passage.

* * * * *